(12) United States Patent
Otsuka

(10) Patent No.: US 11,949,887 B2
(45) Date of Patent: Apr. 2, 2024

(54) TRANSMISSION APPARATUS, TRANSMISSION METHOD, AND PROGRAM

(71) Applicant: Sony Interactive Entertainment Inc., Tokyo (JP)

(72) Inventor: Katsushi Otsuka, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 47 days.

(21) Appl. No.: 17/638,407

(22) PCT Filed: Aug. 28, 2020

(86) PCT No.: PCT/JP2020/032658
§ 371 (c)(1),
(2) Date: Feb. 25, 2022

(87) PCT Pub. No.: WO2021/039983
PCT Pub. Date: Mar. 4, 2021

(65) Prior Publication Data
US 2022/0345720 A1 Oct. 27, 2022

(30) Foreign Application Priority Data
Aug. 29, 2019 (JP) .................................. 2019-157110

(51) Int. Cl.
*H04N 19/164* (2014.01)
*H04N 19/105* (2014.01)
(Continued)

(52) U.S. Cl.
CPC ......... *H04N 19/164* (2014.11); *H04N 19/105* (2014.11); *H04N 19/146* (2014.11); *H04N 19/436* (2014.11)

(58) Field of Classification Search
CPC .. H04N 19/436; H04N 19/146; H04N 19/105; H04N 19/164
See application file for complete search history.

(56) References Cited

U.S. PATENT DOCUMENTS

2002/0150158 A1* 10/2002 Wu .................. H04N 19/51
375/240.12

FOREIGN PATENT DOCUMENTS

| JP | 2011071692 A | 4/2011 |
|----|--------------|--------|
| JP | 2014182793 A | 9/2014 |
| JP | 2018152656 A | 9/2018 |

OTHER PUBLICATIONS

International Search Report for corresponding PCT Application No. PCT/JP2020/032658, 4 pages, dated Nov. 24, 2020.
(Continued)

*Primary Examiner* — On S Mung
(74) *Attorney, Agent, or Firm* — Matthew B. Dernier, Esq.

(57) ABSTRACT

A transmission apparatus, a transmission method, and a program that can reduce the number of times that useless transmission of image data is performed due to a failure in reception of image data indicating a reference destination. A transmission failure likelihood data management section checks the likelihood of a failure in transmission of first image data. Second image is an image rendered in a frame buffer for the first time after a timing when a predetermined time has elapsed since the transmission of the first image data. An encoding processing section controls whether or not to generate second image data requiring no reference destination, depending on the likelihood of the failure in the transmission of the first image data at a timing of encoding the second image.

10 Claims, 11 Drawing Sheets

(51) Int. Cl.
*H04N 19/146* (2014.01)
*H04N 19/436* (2014.01)

(56) References Cited

OTHER PUBLICATIONS

Notice of Reasons for Refusal for corresponding JP Application No. 2021-543057, 8 pages dated Oct. 12, 2022.

* cited by examiner

F I G. 1
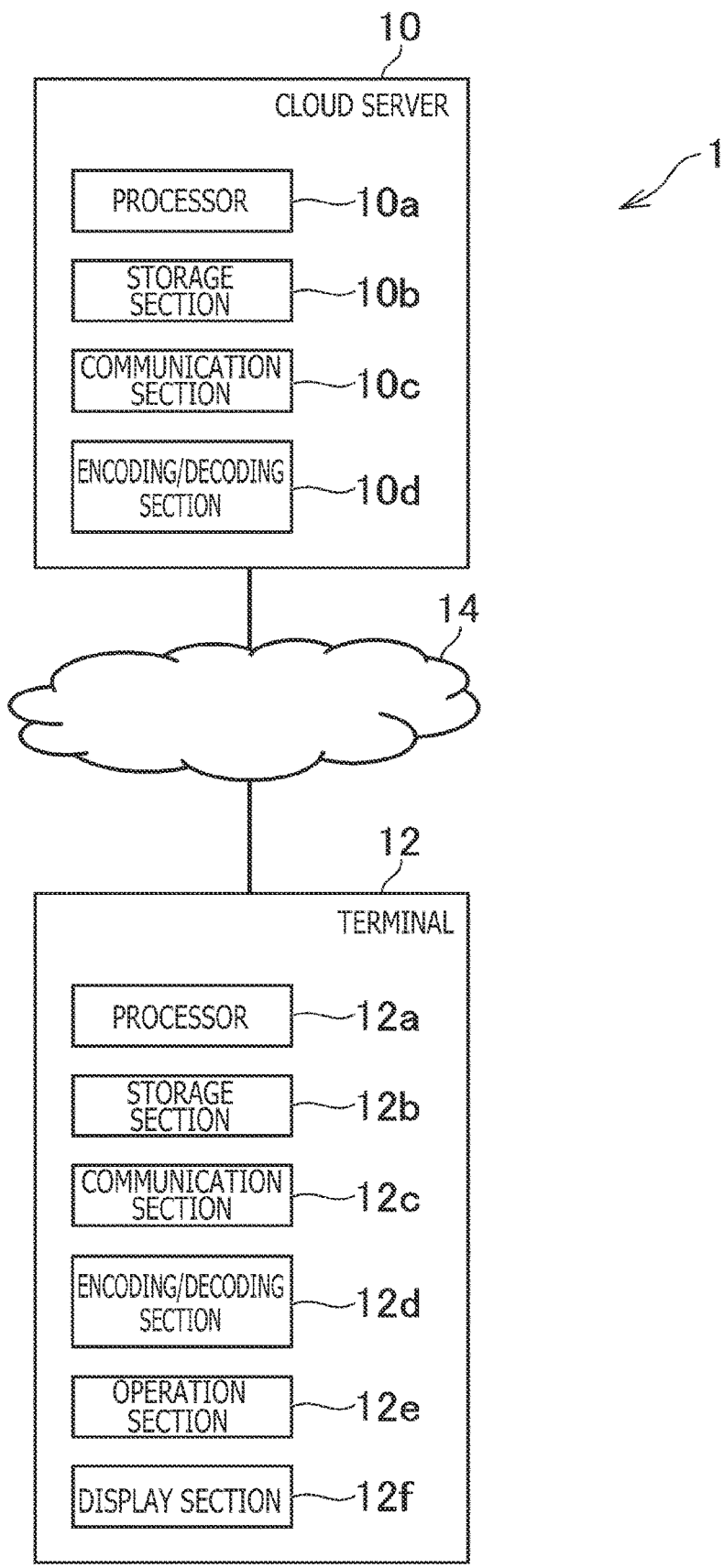

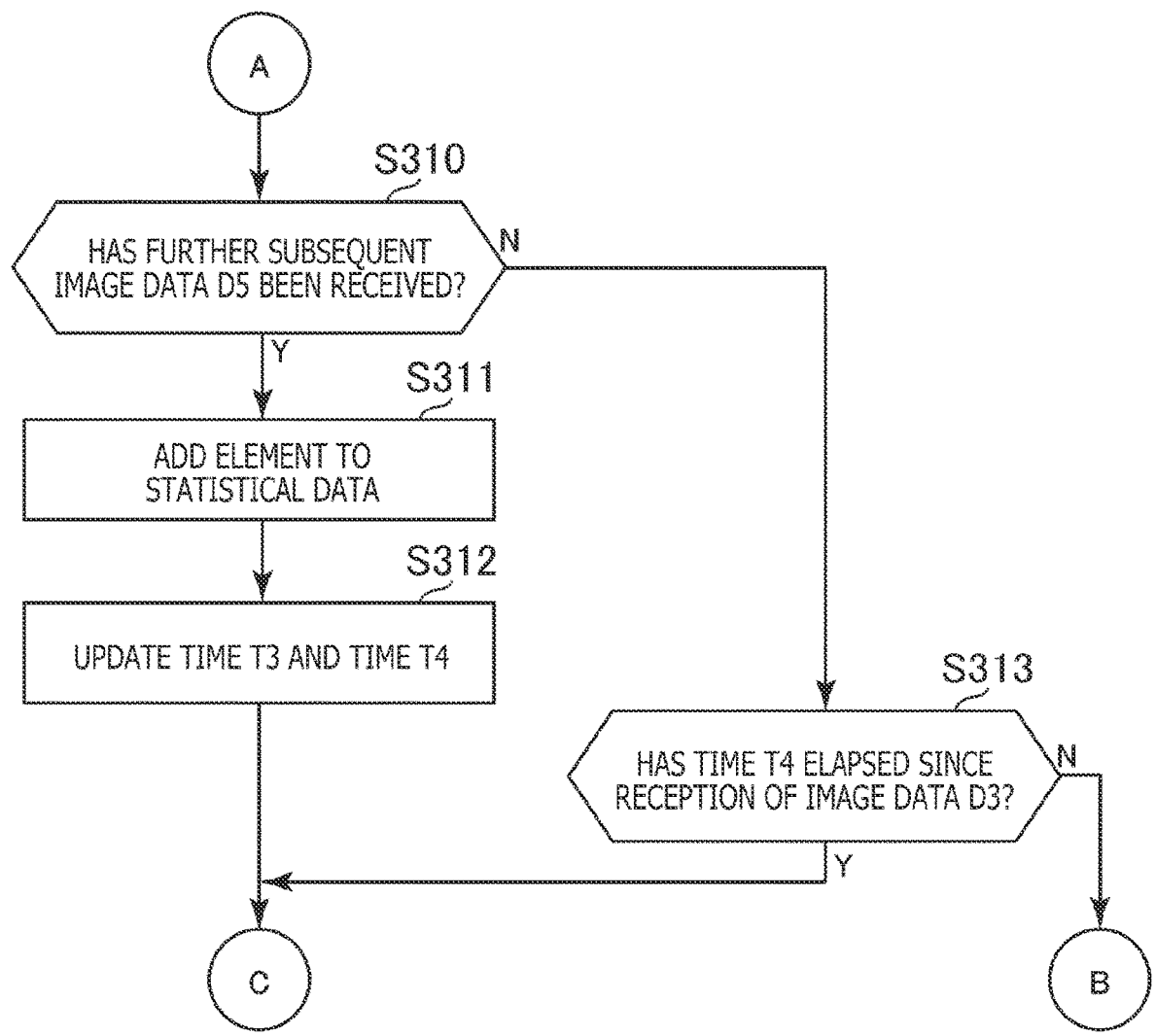

TRANSMISSION APPARATUS, TRANSMISSION METHOD, AND PROGRAM

TECHNICAL FIELD

The present invention relates to a transmission apparatus, a transmission method, and a program.

BACKGROUND ART

In a cloud gaming service technology which has been attracting attention in recent years, an image representing the play status of a game is generated in a cloud server. Then, image data obtained by encoding the image is transmitted from the cloud server to a terminal, and the terminal obtains an image by decoding the image data and displays the image. This series of processing operations is executed repetitively, and a moving image representing the play status of the game is thus displayed in the terminal.

Additionally, there is a known technology for setting a reference destination to compress the size of image data generated by encoding an image. For example, the size of image data obtained by encoding a frame image is reduced in a case where the frame image is encoded into a P frame requiring a reference destination, compared with a case where the frame image is encoded into an I frame requiring no reference destination.

SUMMARY

Technical Problem

Due to an adverse effect resulting from an overloaded server or network or an unstable connection to the server or the network, a terminal may fail in reception of image data. For example, the image data may not reach the terminal, or a part or the whole of the image data received by the terminal may be corrupted.

Here, even when the terminal succeeds in receiving image data requiring a reference destination, if the terminal has failed in reception of image data indicating the reference destination of the image data, the image data that is successfully received cannot be decoded. Thus, the transmission of the image data by the cloud server is useless. For prevention of such useless transmission of image data, it is conceivable that image data requiring no reference destination may be transmitted in response to a timeout of reception of the image data indicating the reference destination.

However, even in this case, useless transmission of image data is performed until the reception of the image data indicating the reference destination times out. By reducing the number of times that such useless transmission of image data is performed, a time lag caused by suspension of transmission of the image data is reduced. Thus, it is possible to resume displaying the image on the terminal immediately.

The present invention is made in light of the above-described circumstances, an object of the present invention is to provide a transmission apparatus, a transmission method, and a program that can reduce the number of times that useless transmission of image data is performed due to a failure in reception of image data indicating a reference destination.

Solution to Problem

In order to solve the above-described problem, a transmission apparatus according to the present invention includes an acquisition section that acquires a first image rendered in a frame buffer and that acquires a second image rendered in the frame buffer, an encoding processing section that encodes the first image to generate first image data and that encodes the second image to generate second image data, a transmission section that transmits the first image data and that transmits the second image data, and a check section that checks likelihood of a failure in transmission of the first image data. The second image is an image rendered in the frame buffer for a first time after a timing when a predetermined time has elapsed since the transmission of the first image data. The encoding processing section controls whether or not to generate the second image data requiring no reference destination, depending on the likelihood of the failure in the transmission of the first image data at a timing of encoding the second image.

In an aspect of the present invention, the check section checks whether or not the transmission of the first image data has been successful, and the encoding processing section controls whether or not to generate the second image data requiring no reference destination, depending on whether or not the successful transmission of the first image data has been confirmed before the timing of encoding the second image.

In this aspect, the check section may check whether or not the transmission of the first image data has been successful, on the basis of whether or not an Ack (Acknowledgement) indicating successful reception of the first image data has been received from a terminal configured to receive the first image data.

Alternatively, the check section may check whether or not the transmission of the first image data has been successful, on the basis of a transmission failure likelihood signal and a transmission failure likelihood cancel signal. The transmission failure likelihood signal indicates that reception of the first image data has not been confirmed, and is transmitted from the terminal configured to receive the first image data. The transmission failure likelihood cancel signal indicates that the successful reception of the first image data has been confirmed, and is transmitted from the terminal after the transmission failure likelihood signal is transmitted.

Additionally, in a case where the successful transmission of the first image data has not been confirmed before the timing of encoding the second image, the encoding processing section may generate two related pieces of the second image data that include one piece of the second image data requiring a reference destination and the other piece of the second image data requiring no reference destination, and the transmission section may control whether to transmit the second image data requiring a reference destination or to transmit the second image data requiring no reference destination, depending on whether or not the successful transmission of the first image data has been confirmed before a timing of transmitting the second image data.

In addition, in an aspect of the present invention, even in a case where a time required to determine that the failure in the transmission of the first image data is timed out has not elapsed, when the predetermined time has elapsed since the transmission of the first image data, the check section determines that the transmission of the first image data is likely to have failed.

Additionally, in an aspect of the present invention, the predetermined time is a time dynamically decided on the basis of statistics for records of transmission of image data.

In addition, the encoding processing section varies a data rate according to a frequency of transmission of image data requiring no reference destination. The frequency of transmission is based on the likelihood of the failure.

Additionally, a transmission method according to the present invention includes a first acquisition step of acquiring a first image rendered in a frame buffer, a first encoding processing step of encoding the first image to generate first image data, a first transmission step of transmitting the first image data, a second acquisition step of acquiring a second image rendered in the frame buffer for a first time after a timing when a predetermined time has elapsed since transmission of the first image data, a check step of checking likelihood of a failure in the transmission of the first image data, a second encoding processing step of encoding the second image to generate second image data, and a second transmission step of transmitting the second image data. In the second encoding processing step, whether or not to generate the second image data requiring no reference destination is controlled depending on the likelihood of the failure in the transmission of the first image data at a timing of encoding the second image.

Additionally, a program according to the present invention causes a computer to execute a first acquisition procedure of acquiring a first image rendered in a frame buffer, a first encoding processing procedure of encoding the first image to generate first image data, a first transmission procedure of transmitting the first image data, a second acquisition procedure of acquiring a second image rendered in the frame buffer for a first time after a timing when a predetermined time has elapsed since transmission of the first image data, a check procedure of checking likelihood of a failure in the transmission of the first image data, a second encoding processing procedure of encoding the second image to generate second image data, and a second transmission procedure of transmitting the second image data. In the second encoding processing procedure, whether or not to generate the second image data requiring no reference destination is controlled depending on the likelihood of the failure in the transmission of the first image data at a timing of encoding the second image.

BRIEF DESCRIPTION OF DRAWINGS

FIG. 1 is a diagram depicting an example of a general configuration of a cloud gaming system according to an embodiment of the present invention.

FIG. 10B is a flowchart depicting an example of a flow of processing executed in the terminal according to the embodiment of the present invention.

DESCRIPTION OF EMBODIMENT

Figure 2:
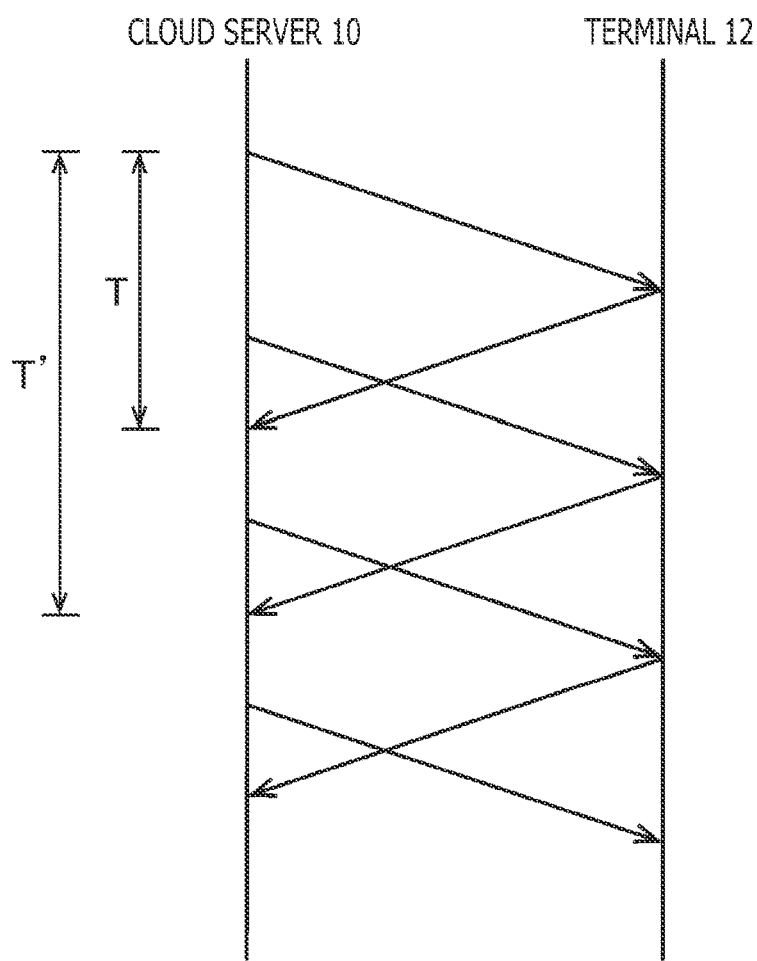
FIG. 2 is a diagram depicting an example of transmission of image data and an Ack.

FIG. 1 is a diagram depicting an example of a general configuration of a cloud gaming system 1 according to an embodiment of the present invention. As depicted in FIG. 1, the cloud gaming system 1 according to the present embodiment includes a cloud server 10 and a terminal 12 that each mainly include a computer. The cloud server 10 and the terminal 12 are connected to a computer network 14 such as the Internet and can communicate with each other.

The cloud server 10 according to the present embodiment is, for example, a server computer that executes a program of a game related to a cloud gaming service. The cloud server 10 distributes a moving image representing a play status of the game, to the terminal 12 used by a user who is playing the game.

As depicted in FIG. 1, the cloud server 10 includes, for example, a processor 10a, a storage section 10b, a communication section 10c, and an encoding/decoding section 10d.

The processor 10a is, for example, a program control device such as a CPU (Central Processing Unit) and executes various types of information processing according to programs stored in the storage section 10b. The processor 10a according to the present embodiment also includes a GPU (Graphics Processing Unit) that renders an image in a frame buffer on the basis of graphics commands and data supplied by the CPU.

The storage section 10b is, for example, a storage element such as a ROM (Read-Only Memory) or a RAM (Random-Access Memory), an SSD (Solid State Drive), or the like. The storage section 10b stores programs and the like to be executed by the processor 10a. Additionally, the storage section 10b according to the present embodiment is provided with a region of the frame buffer in which the GPU included in the processor 10a renders images.

The communication section 10c is, for example, a communication interface for transmitting and receiving data to and from a computer such as the terminal 12 via the computer network 14.

The encoding/decoding section 10d includes, for example, an encoder and a decoder. The encoder encodes an input image to generate image data indicating the image. Additionally, the decoder decodes input image data and outputs an image indicated by the image data.

The terminal 12 according to the present embodiment is, for example, a computer such as a game console, a personal computer, a tablet terminal, or a smartphone which is used by a user who uses a cloud gaming service.

As depicted in FIG. 1, the terminal 12 includes, for example, a processor 12a, a storage section 12b, a communication section 12c, an encoding/decoding section 12d, an operation section 12e, and a display section 12f.

The processor 12a is, for example, a program control device such as a CPU and executes various types of information processing according to programs stored in the storage section 12b. The processor 12a according to the present embodiment also includes a GPU that renders an image in a frame buffer on the basis of graphics commands and data supplied by the CPU.

The storage section 12b is, for example, a storage element such as a ROM or a RAM, an SSD, or the like. The storage section 12b stores programs and the like to be executed by the processor 12a. Additionally, the storage section 12b according to the present embodiment is provided with a region of the frame buffer in which the GPU included in the processor 12a renders images.

The communication section 12c is, for example, a communication interface for transmitting and receiving data to and from a computer such as the cloud server 10 via the computer network 14.

The encoding/decoding section 12d includes, for example, an encoder and a decoder. The encoder encodes an input image to generate image data indicating the image. Additionally, the decoder decodes input image data and outputs an image indicated by the image data.

The operation section 12e is, for example, an operation member for providing an operation input to the processor 12a.

The display section 12f is, for example, a display device such as a liquid crystal display or an organic EL (Electroluminescent) display.

Note that the terminal 12 need not include a GPU or a frame buffer.

When an operation related to a game is performed on the terminal 12 according to the present embodiment via the operation section 12e, an operation signal representing the operation is transmitted from the terminal 12 to the cloud server 10. Then, game processing corresponding to the operation signal is executed in the cloud server 10. Then, a play image that is used as a frame image representing the play status of the game reflecting the operation signal is generated, and the play image is rendered in a frame buffer in the cloud server 10. In the present embodiment, the game processing and the generation of a play image are repetitively executed.

Then, the cloud server 10 sequentially acquires the play image rendered in the frame buffer and generates image data indicating the play image. Then, the cloud server 10 transmits the generated image data to the terminal 12. The terminal 12 then decodes the image data received from the cloud server 10, to generate a play image, and causes the display section 12f to display the generated play image. As described above, in the present embodiment, a sequence of play images is displayed on the display section 12f.

In the present embodiment, for example, the cloud server 10 transmits, to the terminal 12, image data requiring no reference destination, such as an I frame, or image data requiring a reference destination, such as a P frame. Note that image data indicating the reference destination may be an I frame or a P frame.

For example, it is assumed that a first image rendered in the frame buffer is encoded to generate first image data and that a second image rendered in the frame buffer is encoded to generate second image data. Here, the second image is assumed to be an image rendered for the first time in the frame buffer after a timing when a predetermined time T1 has elapsed since the transmission of the first image data. The predetermined time T1 is a timeout time for speculatively determining that transmission is likely to have failed (speculative timeout time). After the transmission of the first image data but before the transmission of the second image data, one or more images may be rendered in the frame buffer, these images may sequentially be encoded to generate image data, and the generated image data may then be transmitted. In other words, the second image need not be an image rendered in a frame immediately after the first image.

In the present embodiment, for example, after the terminal 12 successfully receives the image data, the terminal 12 transmits, to the cloud server 10, an Ack indicating that the reception of the image data has been successful, as depicted in FIG. 2. FIG. 2 is a diagram depicting an example of transmission of image data and an Ack. In FIG. 2, an arrow from the cloud server 10 to the terminal 12 represents transmission of image data, whereas an arrow from the terminal 12 to the cloud server 10 represents transmission of an Ack.

Here, a time T1 may dynamically be decided on the basis of statistics for records of transmission of image data (for example, statistics for a transmission time T that is a time from transmission of image data until reception of an Ack indicating that the reception of the image data has been successful, as depicted in FIG. 2).

Figure 3:
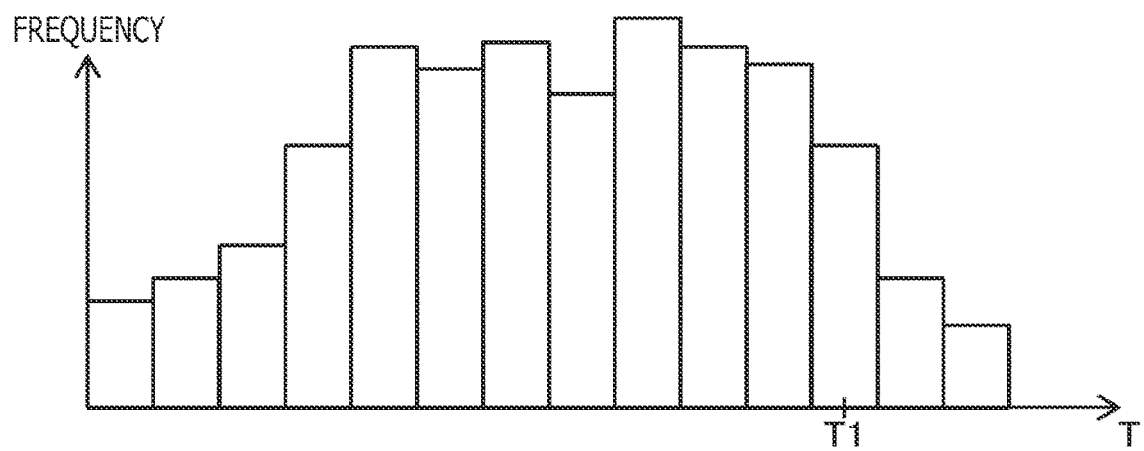
FIG. 3 is a diagram schematically depicting an example of statistical data.

FIG. 3 is a diagram schematically depicting an example of statistical data indicating the statistics for the transmission time T described above. For example, the cloud server 10 may generate statistical data depicted in FIG. 3. Then, the cloud server 10 may decide the time T1 on the basis of the statistical data. For example, when the transmission times T are arranged in order of decreasing time, the transmission time T corresponding to the top predetermined percentage of all the transmission times T (for example, 10%) may be decided to be the time T1. In this case, 90% of the transmission times T of the transmitted image data are each equal to or shorter than the time T1.

Further, in the present embodiment, a method for encoding the second image is changed depending on the likelihood of a failure in the transmission of the first image data at the timing of encoding the second image. Thus, it is controlled whether or not to generate second image data requiring no reference destination. For example, in a case where it has not been confirmed that the transmission of the first image data is successful before the timing of encoding the second image, second image data requiring no reference destination is generated before the reception of the first image data by the terminal 12 times out.

Here, the timeout of reception means, for example, that a time T' has been elapsed. The time T' is a time from transmission of image data by the cloud server 10 until reception, by the cloud server 10, of a signal transmitted by the terminal 12 in response to reception of next image data that follows the image data, as depicted in FIG. 2. The time from the transmission of the first image data until encoding of the second image is shorter than the time T'.

Even when the terminal 12 successfully receives image data requiring a reference destination, if the terminal 12 has failed in reception of image data indicating the reference destination of the image data, the image data that is successfully received cannot be decoded. Thus, the transmission of the image is useless. Note that image data indicating the reference destination may be an I frame or a P frame.

Here, for prevention of useless transmission of image data, it is conceivable that image data requiring no reference destination may be transmitted in response to a timeout of reception of the image data indicating the reference destination.

However, even in this case, useless transmission of image data is performed until the reception of the image data indicating the reference destination times out.

In the present embodiment, as described above, in a case where it has not been confirmed that the transmission of the first image data is successful before the timing of encoding the second image, second image data requiring no reference destination is generated before the reception of the first image data times out. In such a manner, according to the present embodiment, it is possible to reduce the number of times that useless transmission of image data is performed due to a failure in the reception of image data indicating the reference destination. Additionally, by reducing the number of times that such useless transmission of image data is performed, a time lag caused by suspension of transmission of the image data is reduced. Thus, it is possible to resume displaying images on the terminal 12 immediately.

Figure 4:
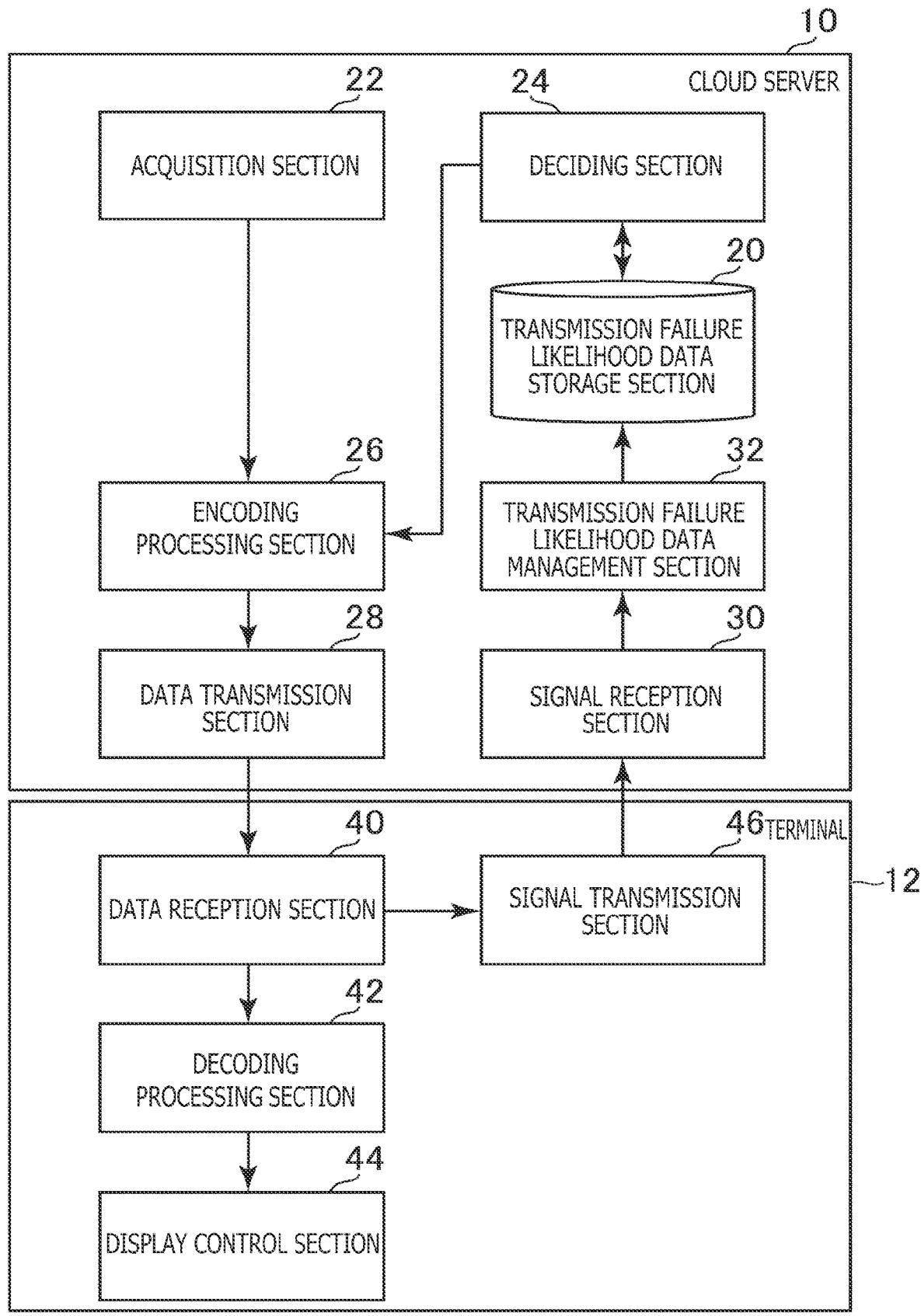
FIG. 4 is a functional block diagram depicting an example of functions implemented in the cloud gaming system according to the embodiment of the present invention.

FIG. 4 is a functional block diagram depicting an example of functions implemented in the cloud gaming system 1 according to the present embodiment. Note that, in the cloud gaming system 1 according to the present embodiment, not all the functions depicted in FIG. 4 need to be implemented and that functions other than those depicted in FIG. 4 (for example, a function to execute game processing on the basis of operation signals and the like and a function to generate play images) may be implemented.

As depicted in FIG. 4, the cloud server 10 according to the present embodiment includes, in terms of functions, a transmission failure likelihood data storage section 20, an acquisition section 22, a deciding section 24, an encoding processing section 26, a data transmission section 28, a signal reception section 30, and a transmission failure likelihood data management section 32, for example.

The transmission failure likelihood data storage section 20 is implemented mainly in the storage section 10b. The acquisition section 22 and the encoding processing section 26 are implemented mainly in the encoding/decoding section 10d. The deciding section 24 and the transmission failure likelihood data management section 32 are implemented mainly in the processor 10a. The data transmission section 28 and the signal reception section 30 are implemented mainly in the communication section 10c.

Further, the functions described above are implemented by executing, by the processor 10a, a program that is installed in the cloud server 10 as a computer and that includes instructions corresponding to the functions described above. The program is supplied to the cloud server 10 via a computer readable information storage medium such as an optical disc, a magnetic disk, a magnetic tape, a magneto-optical disk, or a flash memory, or via the Internet or the like.

Additionally, as depicted in FIG. 4, the terminal 12 according to the present embodiment includes, in terms of functions, a data reception section 40, a decoding processing section 42, a display control section 44, and a signal transmission section 46, for example.

The data reception section 40 is implemented mainly in the communication section 12c. The decoding processing section 42 is implemented mainly in the encoding/decoding section 12d. The display control section 44 is implemented mainly in the processor 12a and the display section 12f. The signal transmission section 46 is implemented mainly in the communication section 12c.

Further, the functions described above are implemented by executing, by the processor 12a, a program that is installed in the terminal 12 as a computer and that includes instructions corresponding to the functions described above. The program is supplied to the terminal 12 via a computer readable information storage medium such as an optical disc, a magnetic disk, a magnetic tape, a magneto-optical disk, or a flash memory, or via the Internet or the like.

In the present embodiment, the transmission failure likelihood data storage section 20 stores, for example, transmission failure likelihood data that includes the identification information (for example, the frame number) of image data the transmission of which is likely to have failed from the cloud server 10 to the terminal 12.

Additionally, in the present embodiment, for example, the transmission failure likelihood data storage section 20 may store the statistical data described above.

In the present embodiment, for example, in the present embodiment, for example, the acquisition section 22 sequentially acquires images rendered in the frame buffer (play images in the example described above). For example, the acquisition section 22 acquires the above-described first image rendered in the frame buffer and acquires the second image rendered in the frame buffer. Here, as described above, the second image is an image rendered for the first time after the timing when the predetermined time T1 has elapsed since the transmission of the first image data.

In the present embodiment, for example, when the image acquired by the acquisition section 22 is encoded, the deciding section 24 decides whether or not image data requiring no reference destination needs to be generated. In this case, for example, whether or not image data requiring no reference destination needs to be generated is decided on the basis of transmission failure likelihood data stored in the transmission failure likelihood data storage section 20.

In the present embodiment, the encoding processing section 26 generates image data, for example, by encoding the image acquired by the acquisition section 22, according to the decision made by the deciding section 24. For example, the encoding processing section 26 encodes the above-described first image to generate first image data. Additionally, the encoding processing section 26 encodes the above-described second image to generate second image data. In addition, the encoding processing section 26 encodes an image different from the above-described first image and the above-described second image to generate image data different from the above-described first image data and the above-described second image data. Here, for example, in a case where the deciding section 24 decides that image data requiring no reference destination needs to be generated, image data requiring no reference destination, such as an I frame, is generated. Otherwise, image data requiring a reference destination may be generated.

In the present embodiment, the data transmission section 28 transmits, to the terminal 12, image data generated by the encoding processing section 26, for example. The data transmission section 28 transmits, for example, the above-described first image data. Additionally, the data transmission section 28 transmits the above-described second image data. Also, the data transmission section 28 transmits image data different from the above-described first image data and the above-described second image data.

In the present embodiment, the signal reception section 30 receives, from the terminal 12, a signal such as an Ack indicating that reception of image data has been successful, for example.

In the present embodiment, the transmission failure likelihood data management section 32 manages, for example, whether or not transmission of image data is likely to have failed. The transmission failure likelihood data management section 32 may serve as, for example, a check section that checks the likelihood of a failure in transmission of the image data. The transmission failure likelihood data management section 32 may check, for example, whether or not the transmission of the image data has been successful. Then, in a case where the transmission of the image data is likely to have failed (for example, in a case where it has not been confirmed that the transmission is successful), the transmission failure likelihood data management section 32 generates new transmission failure likelihood data including the identification information (for example, the frame number) of the image data. Then, the transmission failure likelihood data management section 32 causes the transmission failure likelihood data storage section 20 to store the generated transmission failure likelihood data.

Subsequently, the transmission failure likelihood data management section 32 deletes the transmission failure likelihood data in a case where it has been confirmed that the transmission of the image data is successful.

Additionally, in response to the reception of the Ack associated with the image data, the transmission failure likelihood data management section 32 adds an element indicating the transmission time T for the image data, to the statistical data stored in the transmission failure likelihood data storage section 20. The transmission failure likelihood data management section 32 then decides the above-described time T1 and a timeout time T2 on the basis of the statistical data to which the element has been added. Here, the timeout time T2 may be decided to be a time twice the longest transmission time T in the statistical data.

In the present embodiment, the data reception section 40 receives, for example, image data transmitted from the cloud server 10.

In the present embodiment, the decoding processing section 42 generates an image, for example, by decoding the image data received by the data reception section 40.

In the present embodiment, the display control section 44, for example, causes the display section 12f of the terminal 12 to display the image generated by the decoding processing section 42.

In the present embodiment, for example, when reception of image data is successful, the signal transmission section 46 transmits, to the cloud server 10, a signal such as the Ack indicating that the reception of the image data has been successful.

Figure 5:
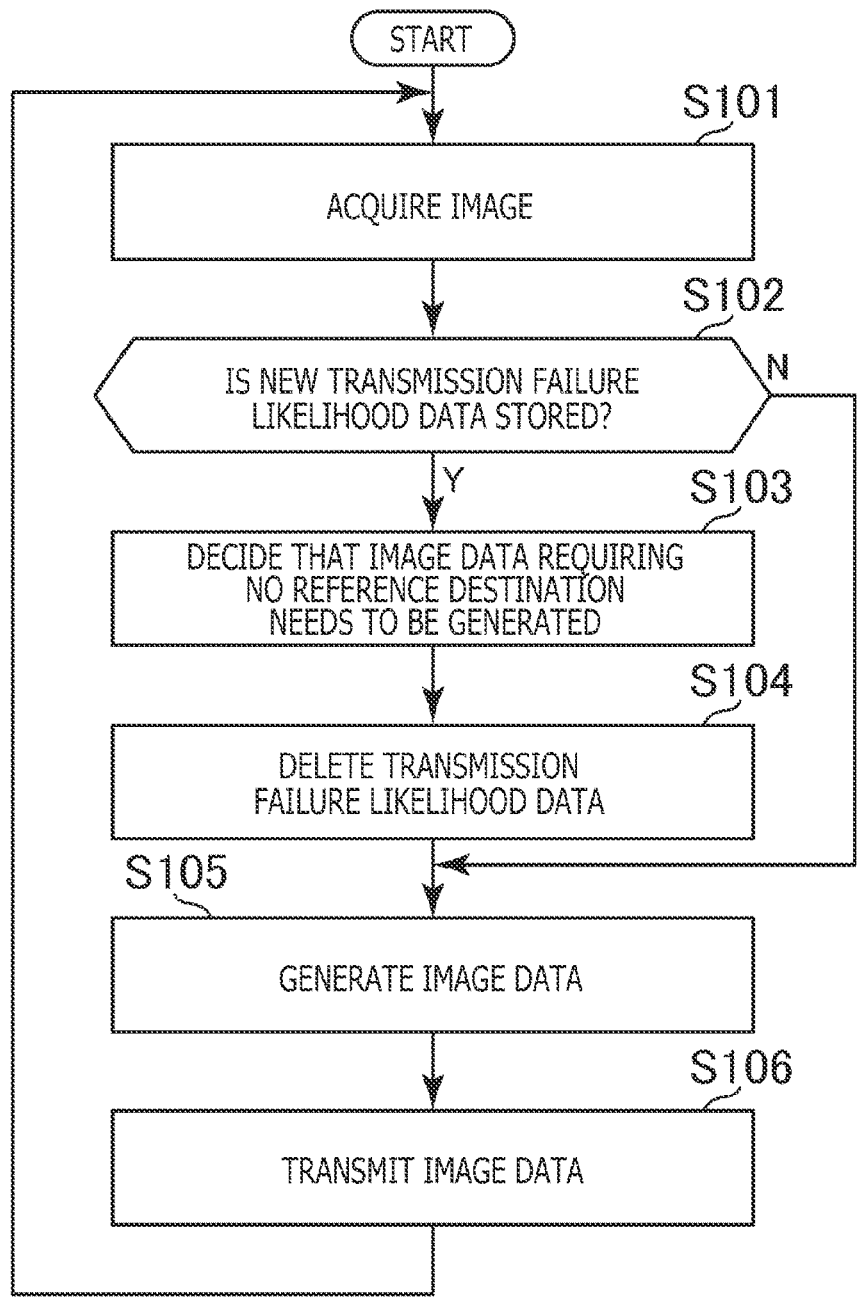
FIG. 5 is a flowchart depicting an example of a flow of processing executed in a cloud server according to the embodiment of the present invention.

Here, an example of a flow of processing executed in the cloud server 10 according to the present embodiment each time an image is rendered in the frame buffer will be described with reference to a flowchart illustrated in FIG. 5. The processing depicted in S101 to S106 in FIG. 5 is repetitively executed at a fixed or a variable frame rate. Note that, in the present processing example, it is assumed that, in each loop, a new frame image is rendered in the frame buffer.

First, the acquisition section 22 acquires a frame image of a frame rendered in the frame buffer (S101).

Then, the deciding section 24 checks whether or not new transmission failure likelihood data is stored in the transmission failure likelihood data storage section 20 (S102).

In a case where it is confirmed that new transmission failure likelihood data is stored in the transmission failure likelihood data storage section 20 (S102: Y), the deciding section 24 decides that image data requiring no reference destination needs to be generated (S103).

Then, the deciding section 24 deletes the new transmission failure likelihood data checked in the processing depicted in S102 (S104).

When the processing depicted in S104 ends, the encoding processing section 26 encodes the frame image acquired in the processing depicted in S101, to generate image data (S105). In a case where it is confirmed in the processing depicted in S102 that new transmission failure likelihood data is not stored in the transmission failure likelihood data storage section 20 (S102: N), the encoding processing section 26 similarly encodes the frame image acquired in the processing depicted in S101, to generate image data (S105).

In a case where it is decided in the processing depicted in S103 that image data requiring no reference destination needs to be generated, image data requiring no reference destination, such as an I frame, is always generated in the processing depicted in S105. In this case, no image data requiring a reference destination, such as a P frame, is generated.

On the other hand, in a case where it is not decided in the processing depicted in S103 that image data requiring no reference destination needs to be generated, either image data requiring no reference destination, such as an I frame, or image data requiring a reference destination, such as a P frame, is generated.

Then, the data transmission section 28 transmits, to the terminal 12, the image data generated in the processing depicted in S105 (S106), and the processing returns to S101.

Figure 6A:
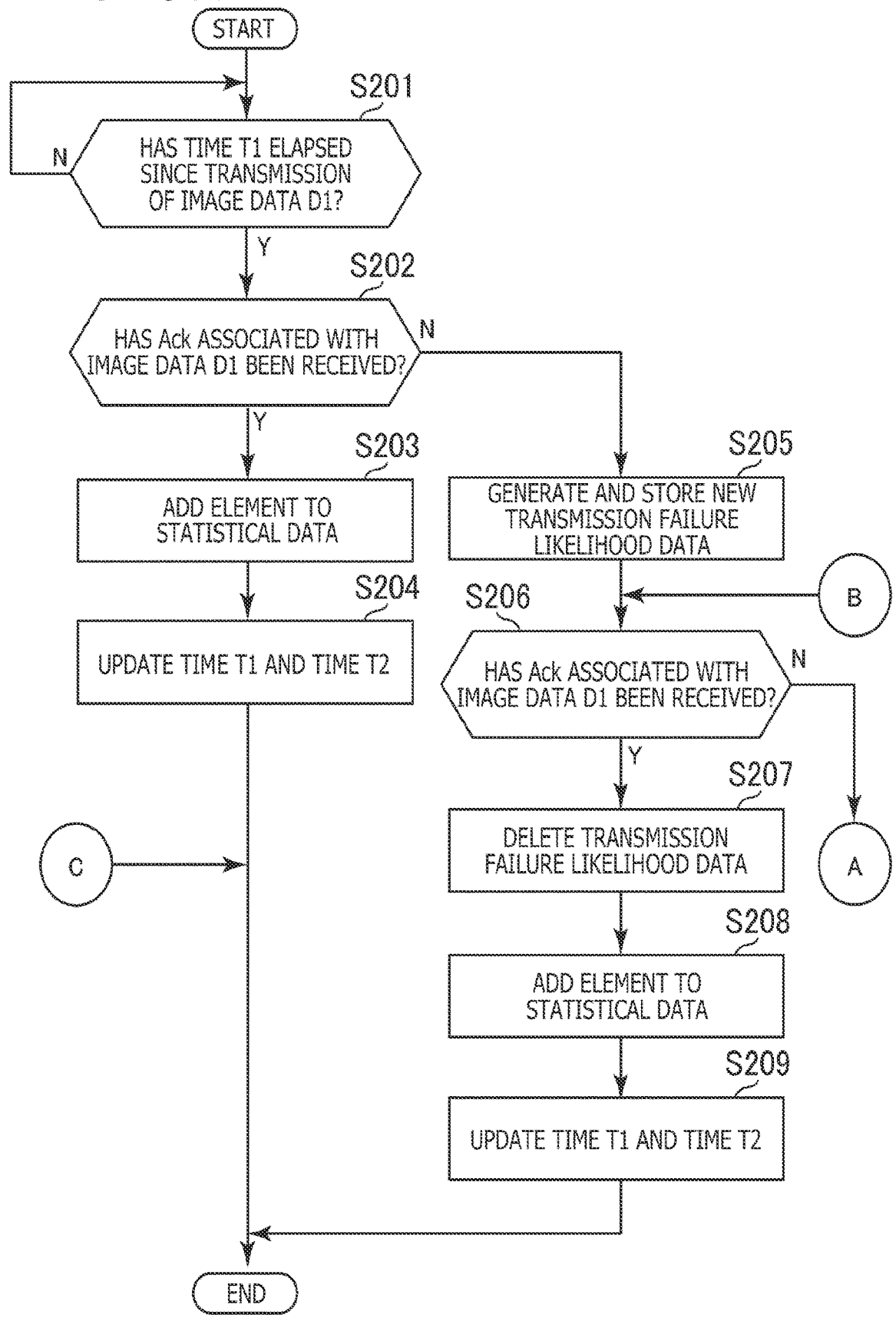
FIG. 6A is a flowchart depicting an example of a flow of processing executed in the cloud server according to the embodiment of the present invention.
Figure 6B:
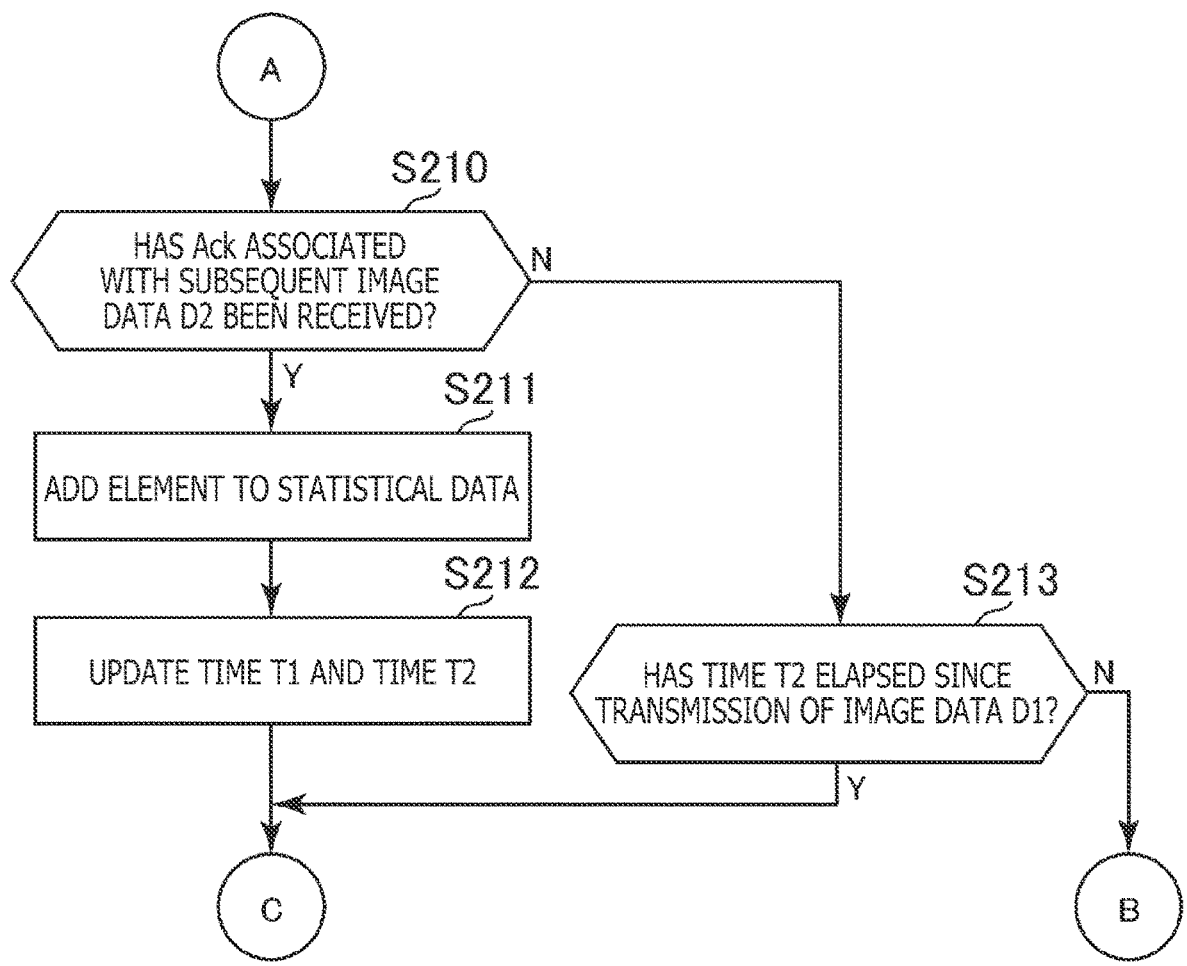
FIG. 6B is a flowchart depicting an example of a flow of processing executed in the cloud server according to the embodiment of the present invention.

Next, an example of a flow of processing executed in the cloud server 10 according to the present embodiment in response to transmission of image data will be described with reference to flowcharts depicted in FIGS. 6A and 6B. Note that processing executed in response to transmission of image data D1 is illustrated below as an example and that the processing depicted in FIGS. 6A and 6B is newly started each time transmission of image data is performed, so that multiple processing operations are executed in parallel.

In the present processing example, it is assumed that, when the image data D1 is successfully received, the terminal 12 transmits, to the cloud server 10, the Ack associated with the image data D1 (for example, the Ack including the identification information of the image data D1 such as the frame number of the image data D1).

First, the transmission failure likelihood data management section 32 waits until the time T1 has elapsed since the transmission of the image data D1 (S201).

After the time T1 has elapsed since the transmission of the image data D1, the transmission failure likelihood data management section 32 checks whether or not the signal reception section 30 has already received, from the terminal 12, the Ack associated with the image data D1 (S202).

Here, in a case where it is confirmed that the signal reception section 30 has received the Ack (S202: Y), the transmission failure likelihood data management section 32 adds an element indicating the transmission time T (D1) of the image data D1, to the statistical data stored in the transmission failure likelihood data storage section 20 (S203).

Then, the transmission failure likelihood data management section 32 updates (recalculates) the time T1 and the time T2 that are specified on the basis of the statistical data to which the element indicating the transmission time T (D1) is added (S204), and the processing illustrated in the present processing example is ended.

On the other hand, in a case where it is confirmed that the signal reception section 30 has not received the Ack (S202: N), the transmission failure likelihood data management section 32 generates new transmission failure likelihood data including the identification information (for example, the frame number) of the image data D1. Then, the transmission failure likelihood data management section 32 causes the transmission failure likelihood data storage section 20 to store the generated transmission failure likelihood data (S205). This case corresponds to a case where it is speculatively confirmed that the transmission of the image data D1 is likely to have failed.

Then, the transmission failure likelihood data management section 32 checks whether or not the signal reception section 30 has received, from the terminal 12, the Ack associated with the image data D1 (S206).

Here, in a case where it is confirmed that the signal reception section 30 has received the Ack (S206: Y), the transmission failure likelihood data management section 32 deletes the transmission failure likelihood data stored in the transmission failure likelihood data storage section 20 in the processing depicted in S203 (S207).

The, the transmission failure likelihood data management section 32 adds the element indicating the transmission time T (D1) of the image data D1, to the statistical data stored in the transmission failure likelihood data storage section 20 (S208).

Then, the transmission failure likelihood data management section 32 updates (recalculates) the time T1 and the time T2 that are specified on the basis of the statistical data to which the element indicating the transmission time T (D1) is added (S209), and the processing illustrated in the present processing example is ended.

On the other hand, in a case where it is confirmed that the signal reception section 30 has not received the Ack (S206: N), the transmission failure likelihood data management section 32 checks whether or not the signal reception section 30 has received, from the terminal 12, the Ack associated with image data D2 that follows the image data D1 (S210). The image data D2 may be transmitted in a frame immediately after the image data D1 or a frame following several frames after the image data D1.

Here, in a case where it is confirmed that the signal reception section 30 has received the Ack (S210: Y), the transmission failure likelihood data management section 32 adds an element indicating the transmission time T (D2) of the image data D2, to the statistical data stored in the transmission failure likelihood data storage section 20 (S211).

Then, the transmission failure likelihood data management section 32 updates (recalculates) the time T1 and the time T2 that are specified on the basis of the statistical data to which the element indicating the transmission time T (D2) is added (S212), and the processing illustrated in the present processing example is ended.

On the other hand, in a case where it is confirmed that the signal reception section 30 has not received the Ack (S210: N), the transmission failure likelihood data management section 32 checks whether or not the time T2 has elapsed since the transmission of the image data D1 (S213). In this case, as described above, the timeout time T2 is longer than the time T1. Additionally, in this case, the time T2 is different from the time T' depicted in FIG. 2.

In a case where it is confirmed that the time T2 has elapsed since the transmission of the image data D1, that is, in a case where a timeout occurs (S213: Y), the processing illustrated in the present processing example is ended.

On the other hand, in a case where it is confirmed that the time T2 has not elapsed since the transmission of the image data D1 (S213: N), the processing returns to S206.

In this case, it is assumed, for example, that the image data D1 is the above-described first image data and that the processing depicted in S101 to S106 in FIG. 5 is executed when the above-described second image is rendered in the frame buffer.

In this case, in the processing depicted in S102, the transmission failure likelihood data management section 32 checks whether or not the transmission failure likelihood data including the identification information of the image data D1 is stored. Here, for example, the transmission failure likelihood data management section 32 checks whether or not the transmission of the first image data has been successful, on the basis of whether or not the Ack indicating the successful reception of the first image data has been received from the terminal 12. Even in a case where the time T' required to determine that a failure in transmission of the first image data is timed out has not elapsed, when the predetermined time T1 has elapsed since the transmission of the first image data, the transmission failure likelihood data management section 32 determines that the transmission of the first image data is likely to have failed.

Even in a case where the time T1 has elapsed since the transmission of the image data D1 and where the transmission failure likelihood data associated with the image data D1 is stored in the transmission failure likelihood data storage section 20, the transmission failure likelihood data is deleted in a case where the terminal 12 subsequently succeeds in receiving the image data D1. In this case, at the timing of encoding the second image, it is confirmed that the transmission of the image data D1 is successful.

In such a manner, the encoding processing section 26 controls whether or not to generate second image data requiring no reference destination, depending on whether or not the transmission of the first image data has been confirmed before the timing of encoding of the second image.

In the above description, the cloud server 10 executes the deciding processing related to the generation and deletion of transmission failure likelihood data. However, the terminal 12 may execute the deciding processing related to the generation and deletion of transmission failure likelihood data.

In this case, the signal transmission section 46 of the terminal 12 does not transmit the Ack to the cloud server 10. Instead, the signal transmission section 46 of the terminal 12 transmits, to the cloud server 10, a transmission failure likelihood signal corresponding to an instruction for generation of transmission failure likelihood data and a transmission failure likelihood cancel signal corresponding to an instruction for deletion of the transmission failure likelihood data.

Figure 7:
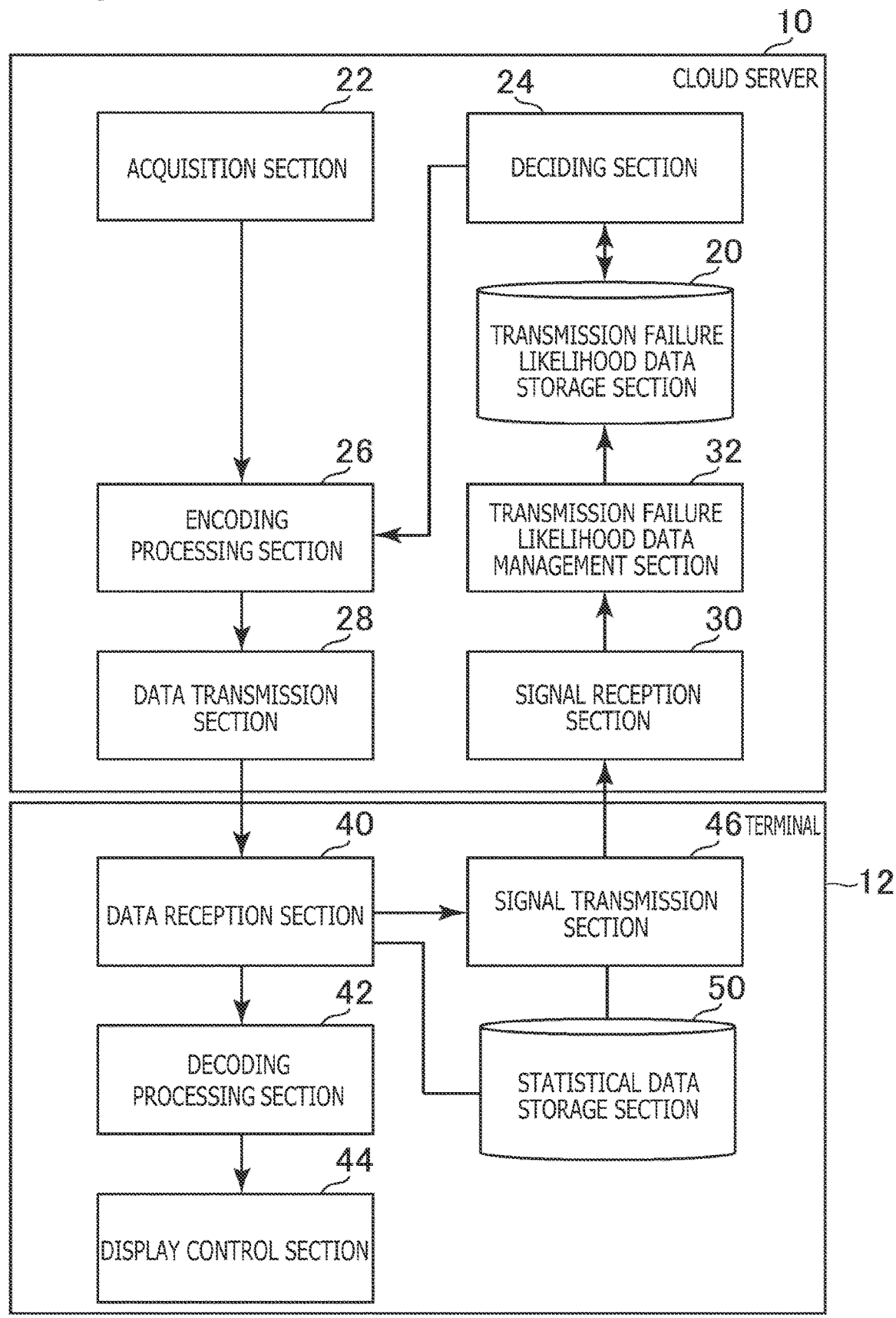
FIG. 7 is a functional block diagram depicting an example of functions implemented in the cloud gaming system according to the embodiment of the present invention.

Additionally, in this case, a time T3 and a time T4 are used instead of the above-described time T1 and time T2. In addition, in this case, as depicted in FIG. 7, the terminal 12 may further include, in terms of functions, a statistical data storage section 50 implemented mainly in the storage section 12b.

Here, the time T3 may be identical to or different from the above-described time T1. Additionally, the time T3 may depend on the time T1. For example, the time T3 may be obtained by subtracting a predetermined time from the time T1.

Figure 8:
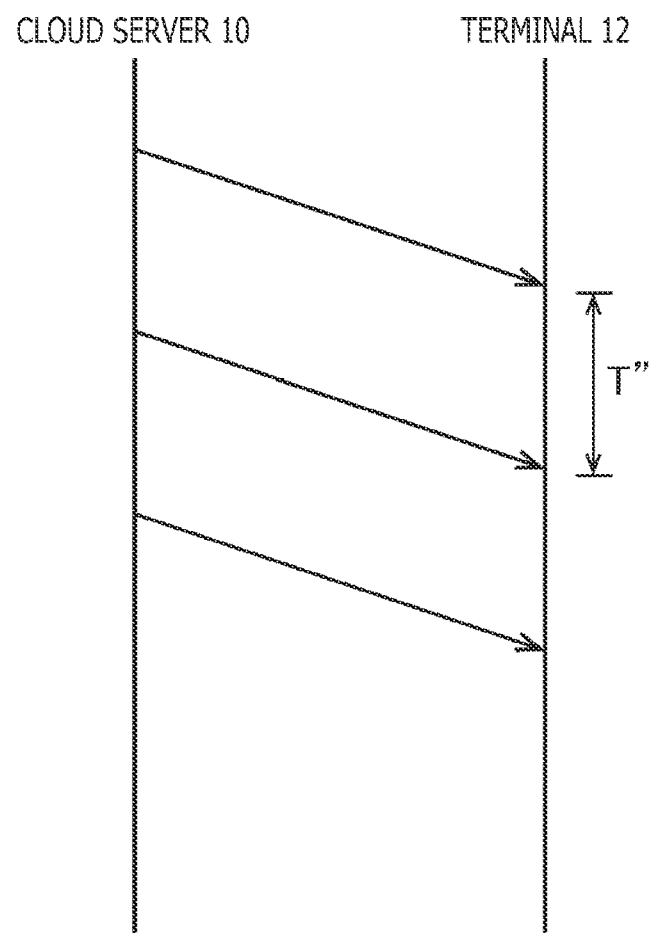
FIG. 8 is a diagram depicting an example of transmission of image data.

Additionally, the time T3 may dynamically be decided on the basis of statistics for records of transmission of image data (for example, statistics for a reception time T" that is a time from reception of image data until reception of next image data following the above-described image data, as depicted in FIG. 8).

Figure 9:
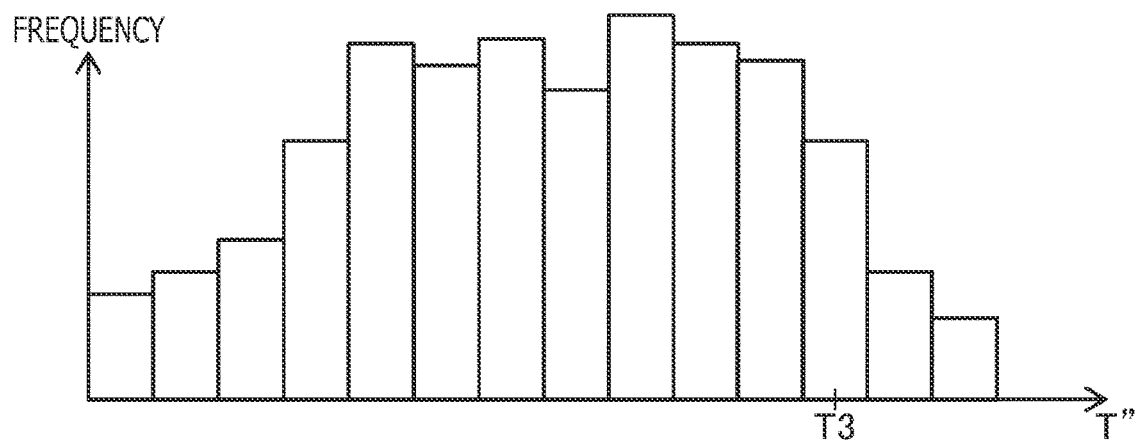
FIG. 9 is a diagram schematically depicting an example of statistical data.

FIG. 9 is a diagram schematically depicting an example of statistical data indicating the statistics for the reception time T" described above. Here, for example, the data reception section 40 may generate statistical data depicted in FIG. 9. Then, the data reception section 40 may cause the statistical data storage section 50 to store the statistical data. Then, the data reception section 40 may decide the time T3 on the basis of the statistical data. For example, when the reception times T" are arranged in order of decreasing time, the reception time T" corresponding to the top predetermined percentage of all the reception times T" (for example, 10%) may be decided to be the time T3. In this case, 90% of the reception times T" of the received image data are each equal to or shorter than the time T3.

Additionally, Here, the timeout time T4 may be decided to be a time twice the longest reception time T" in the statistical data.

Figure 10A:
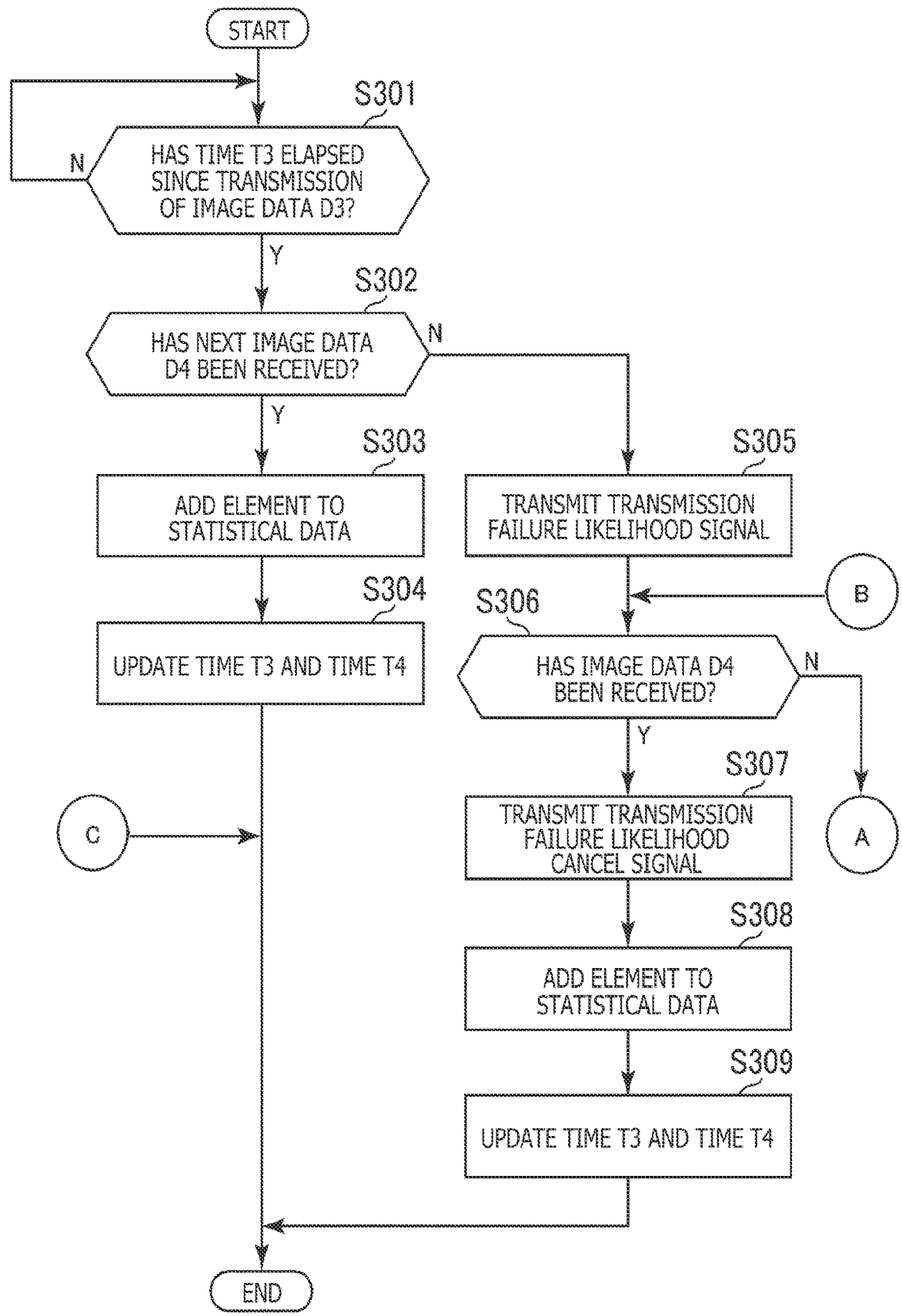
FIG. 10A is a flowchart depicting an example of a flow of processing executed in a terminal according to the embodiment of the present invention.

Now, an example of a flow of processing executed in the above-described case in the terminal 12 according to the present embodiment in response to reception of image data will be described with reference to flowcharts depicted in FIGS. 10A and 10B. Note that processing executed in response to reception of image data D3 is illustrated below as an example and that the processing depicted in FIGS. 10A and 10B is newly started each time reception of image data is performed, so that multiple processing operations are executed in parallel.

First, the signal transmission section 46 waits until the time T3 has elapsed since the reception of the image data D3 (S301).

After the time T3 has elapsed since the reception of the image data D3, the signal transmission section 46 checks whether or not the data reception section 40 has received image data D4 that is next data following the image data D3 (S302). Note that, in the first execution of processing illustrated in the present processing example, the processing depicted in S301 is omitted, and the processing depicted in S302 is executed.

Here, in a case where it is confirmed that the image data D4 has been received (S302: Y), the data reception section 40 adds an element indicating the reception time T" (D4) of the image data D4, to the statistical data stored in the statistical data storage section 50 (S303).

Then, the data reception section 40 updates (recalculates) the time T3 and the time T4 that are specified on the basis of the statistical data to which the element indicating the reception time T" (D4) is added (S304), and the processing illustrated in the present processing example is ended.

On the other hand, in a case where it is confirmed that the image data D4 has not been received (S302: N), the signal transmission section 46 transmits, to the cloud server 10, the transmission failure likelihood signal indicating that the reception of the image data D4 has not been confirmed (S305). Here, for example, the transmission failure likelihood signal associated with the identification information (for example, the frame number) of the image data D4 is transmitted. This case corresponds to a case where it is speculatively confirmed that the transmission of the image data D4 is likely to have failed.

Then, the signal transmission section 46 checks whether or not the data reception section 40 has received the image data D4 (S306).

Here, in a case where it is confirmed that the image data D4 has been received (S306: Y), the signal transmission section 46 transmits, to the cloud server 10, the transmission failure likelihood cancel signal indicating that the successful reception of the image data D4 has been confirmed (S307). In this case, for example, the transmission failure likelihood cancel signal associated with the identification information (for example, the frame number) of the image data D4 is transmitted.

Then, the data reception section 40 adds the element indicating the reception time T" (D4) of the image data D4, to the statistical data stored in the statistical data storage section 50 (S308).

Then, the data reception section 40 updates (recalculates) the time T3 and the time T4 that are specified on the basis of the statistical data to which the element indicating the reception time T" (D4) is added (S309), and the processing illustrated in the present processing example is ended.

On the other hand, in a case where it is confirmed that the image data D4 has not been received (S307: N), the signal transmission section 46 checks whether or not the data reception section 40 has received image data D5 further following the image data D4 (S310). The image data D5 may be received in a frame immediately after the image data D4 or a frame following several frames after the image data D4.

Here, in a case where it is confirmed that the image data D5 has been received (S310: Y), an element indicating the reception time T" (D5) of the image data D5 is added to the statistical data stored in the statistical data storage section 50 (S311). In this case, for example, the reception time T" (D5) of the image data D5 may be a time that is half the time from the reception of the image data D3 until the reception of the image data D5.

Then, the data reception section 40 updates (recalculates) the time T3 and the time T4 that are specified on the basis of the statistical data to which the element indicating the reception time T" (D5) is added (S312), and the processing illustrated in the present processing example is ended. Note that the processing depicted in S311 and S312 need not be executed.

On the other hand, in a case where it is confirmed that the image data D5 has not been received (S310: N), the transmission failure likelihood data management section 32 checks whether or not the time T4 has elapsed since the reception of the image data D3 (S313). Here, as described above, the timeout time T4 is longer than the time T3. Additionally, in this case, the time T4 is different from the time T' depicted in FIG. 2.

In a case where it is confirmed that the time T4 has elapsed since the reception of the image data D3 (S313: Y), the processing illustrated in the present processing example is ended.

On the other hand, in a case where it is confirmed that the time T4 has not elapsed since the reception of the image data D3, that is, in a case where a timeout occurs (S313: N), the processing returns to S306.

In response to the reception, by the signal reception section 30, of the transmission failure likelihood signal associated with the identification information of the image data, the transmission failure likelihood data management section 32 generates new transmission failure likelihood data including the identification information. Then, the transmission failure likelihood data management section 32 causes the transmission failure likelihood data storage section 20 to store the generated transmission failure likelihood data.

Additionally, in response to the reception, by the signal reception section 30, of the transmission failure likelihood cancel signal associated with the identification information of the image data, the transmission failure likelihood data management section 32 deletes the transmission failure likelihood data that includes the identification information and that is stored in the transmission failure likelihood data storage section 20.

In a case where the processing depicted in S301 to S307 described above is executed by the terminal 12, the processing depicted in S201 to S207 described above is not executed by the cloud server 10, but the processing depicted in S101 to S106 described above is executed by the cloud server 10.

Here, it is assumed, for example, that the image data D4 is the above-described first image data and that the processing depicted in S101 to S106 in FIG. 5 is executed when the above-described second image is rendered in the frame buffer.

In this case, the transmission failure likelihood data management section 32 checks whether or not the transmission of the first image data is likely to have failed, on the basis of the above-described transmission failure likelihood signal and transmission failure likelihood cancel signal.

Then, as is the case with the above-described example, the encoding processing section 26 controls whether or not to generate second image data requiring no reference destination, depending on whether or not the transmission of the first image data has succeeded before the timing of encoding of the second image. Thus, also in this case, it is possible to reduce the number of times that useless transmission is performed due to a failure in reception of image data indicating the reference destination.

Figure 11:
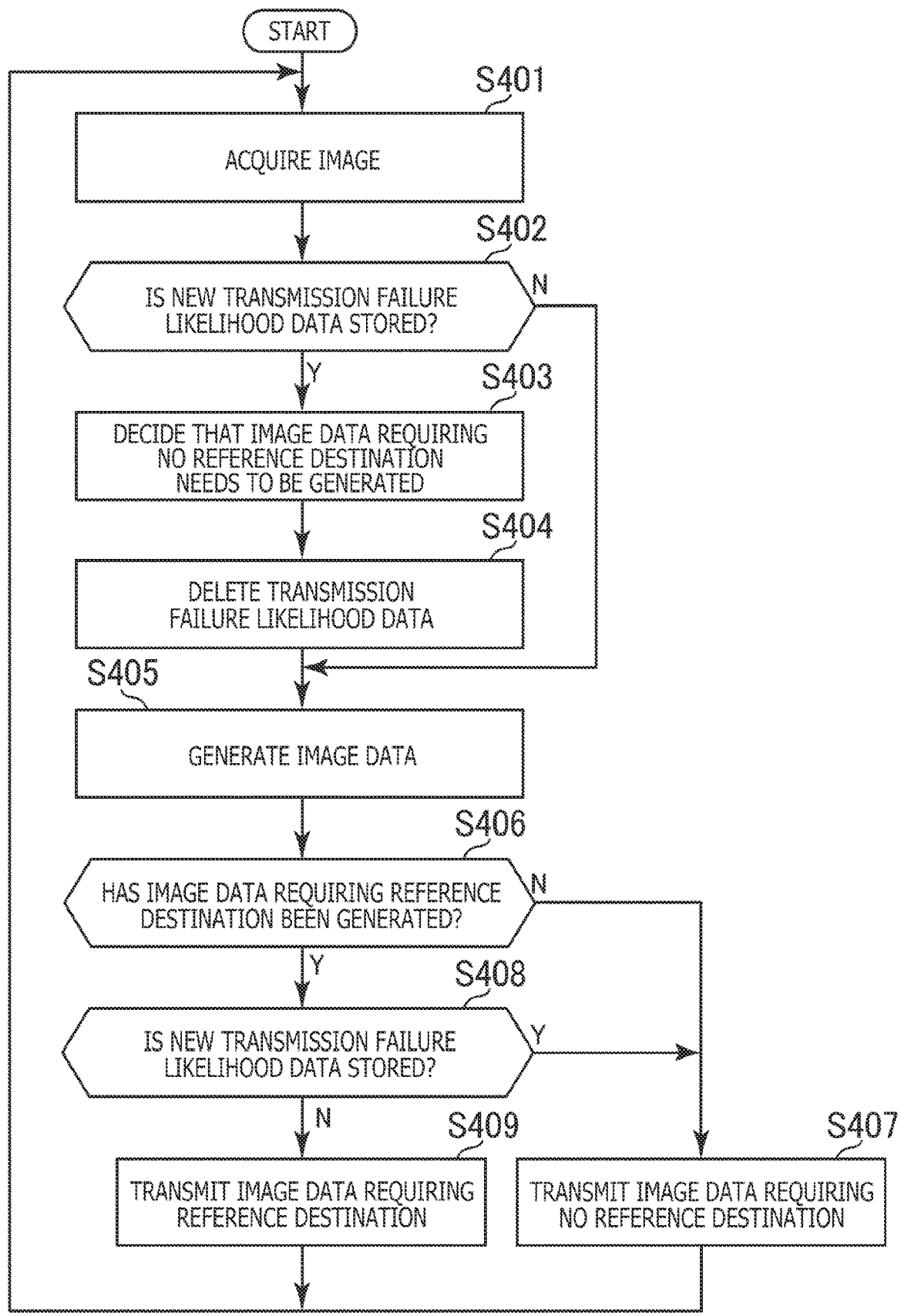
FIG. 11 is a flowchart depicting an example of a flow of processing executed in the cloud server according to the embodiment of the present invention.

Next, with reference to a flowchart illustrated in FIG. 11, an example of a flow of processing that is executed, instead of the processing depicted in S101 to S106 described above, in the cloud server 10 each time an image is rendered in the frame buffer will be described. Processing depicted in S401 to S409 in FIG. 11 is repetitively executed at a fixed or a variable frame rate. Note that the present processing example assumes that, in each loop, a new frame image is rendered in the frame buffer.

Additionally, the present processing example assumes that the encoding/decoding section 10d includes two systems and can generate two related pieces of image data in parallel on the basis of one image.

The processing depicted in S401 to S404 is similar to the processing depicted in S101 to S104 and will thus not be described below.

When the processing depicted in S404 ends, the encoding processing section 26 encodes a frame image acquired in the processing depicted in S401, to generate image data (S405). In a case where it is confirmed in the processing depicted in S402 that no new transmission failure likelihood data is stored (S402: N), the encoding processing section 26 similarly encodes the frame image acquired in the processing depicted in S401, to generate image data (S405).

In the processing depicted in S405, in a case where it is decided in the processing depicted in S403 that image data requiring no reference destination needs to be generated, image data requiring no reference destination, such as an I frame, is always generated. In this case, for example, image data requiring no reference destination, such as an I frame, is generated, and image data requiring a reference destination, such as a P frame, need not be generated. Alternatively, both image data requiring no reference destination and image data requiring a reference destination may be generated.

On the other hand, in a case where it is not decided in the processing depicted in S403 that image data requiring no reference destination needs to be generated, either image data requiring no reference destination, such as an I frame, or image data requiring a reference destination, such as a P frame, is generated.

Then, in the processing depicted in S405, the data transmission section 28 checks whether or not image data requiring a reference destination, such as a P frame, has been generated (S406).

In a case where it is confirmed that no image data requiring a reference destination has been generated (S406: N), the data transmission section 28 transmits, to the terminal 12, image data requiring no reference destination, such as an I frame, which has been generated in the processing depicted in S405 (S407), and the processing returns to S401.

On the other hand, in a case where it is confirmed that image data requiring a reference destination has been generated (S406: Y), the data transmission section 28 checks whether or not the new transmission failure likelihood data checked in the processing depicted in S402 is still stored in the transmission failure likelihood data storage section 20 (S408).

It is assumed that the data transmission section 28 confirms that the transmission failure likelihood data is stored in the transmission failure likelihood data storage section 20 (S408: Y). In this case, the data transmission section 28 transmits, to the terminal 12, image data requiring no reference destination, such as an I frame, which has been generated in the processing depicted in S405 (S407), and the processing returns to S401.

On the other hand, it is assumed that the data transmission section 28 confirms that the transmission failure likelihood data is not stored in the transmission failure likelihood data storage section 20 (S408: N). In this case, the data transmission section 28 transmits, to the terminal 12, image data requiring a reference destination, such as a P frame, which has been generated in the processing depicted in S405 (S409), and the processing returns to S401.

In a case where the processing depicted in S401 to S409 is executed instead of the processing depicted in S101 to S106, the processing depicted in S201 to S213 may be executed, or the processing depicted in S301 to S313 may be executed.

Here, it is assumed, for example, that the image data D1 or the image data D4 is the above-described first image data and that the processing depicted in S401 to S409 in FIG. 11 is executed when the above-described second image is rendered in the frame buffer.

In this case, in a case where it is not confirmed that the transmission of the first image data has been successful before the timing of encoding the second image, the encoding processing section 26 generates two related pieces of second image data, that is, one piece of second image data requiring a reference destination and the other piece of second image data requiring no reference destination. Then, depending on whether or not the successful transmission of the first image data has been confirmed before the timing of transmitting the second image data, the data transmission section 28 controls whether to transmit the second image data requiring a reference destination or transmit the second image data requiring no reference destination.

Thus, in a case where the successful transmission of the first image data has not been confirmed before the timing of transmitting the second image, generation and transmission of the second image data requiring no reference destination are executed without waiting for the timeout of reception of the first image data. Thus, also in this case, it is possible to reduce the number of times that useless transmission of image data is performed due to a failure in reception of image data (in this case, for example, the first image data) indicating the reference destination.

Additionally, in the processing depicted in S405, both image data requiring no reference destination and image data requiring a reference destination may be generated in some cases. In such a case, after two related pieces of image data have been generated, which requires a certain amount of time, the image data requiring a reference destination can be transmitted on the basis of the likelihood that transmission of the latest first image data has failed. Thus, by speculatively confirming that the transmission of the first image data is likely to have failed, it is possible to reduce the frequency at which image data requiring no reference destination is transmitted even though image data requiring a reference destination can be transmitted. Consequently, the time T1 and the time T3 can be set shorter in the processing depicted in FIG. 11 than those in the processing depicted in FIG. 5. In this case, an undesired increase in amount of data to be transmitted is prevented, and when a failure in the transfer actually occurs, a restoration time can be reduced.

Note that the communication sequence described above is an example of a communication sequence related to transmission of image data requiring no reference destination, such as an I frame, and that the range of application of the present invention is not limited to the communication sequence described above.

Additionally, frame images have been described as units of encoding and transmission. However, encoding and transmission need not be performed in units of frame images. The present embodiment is also applicable to, for example, a situation where encoding is performed by using a GDR (Gradual Decoder Refresh) technology and a situation where encoding and transmission of image data are performed by using a slice transfer scheme in which one frame image is divided into multiple portions for transmission.

Additionally, in the present embodiment, a machine learning model such as for deep learning may be used to implement processing of checking the likelihood of a failure in transmission of image data and processing of dynamically deciding the above-described time T1 and time T3.

Additionally, in the present embodiment, the encoding processing section 26 may generate image data requiring a reference destination for an image rendered in the frame buffer, after rendering of the first image but before rendering of the second image. Here, for example, for a difference in amount of scene change or in feature value between an image in a preceding frame and the current image, in a case where an amount indicating the difference is greater than a predetermined amount, the encoding processing section 26 may generate image data requiring no reference destination, as necessary.

Additionally, in the present embodiment, the cloud server 10 may vary the data rate according to a frequency of transmission of image data requiring no reference destination, the frequency of transmission being based on the likelihood of a failure in transmission of image data. For example, the transmission failure likelihood data management section 32 may specify the number of times that transmission of image data requiring no reference destination is performed per unit time during the last predetermined period of time, the number being based on the likelihood of a failure in transmission of image data. Then, the encoding processing section 26 may vary the data rate according to the number of transmission times. The encoding processing section 26 may vary the data rate, for example, by varying the frequency of frame skips or a change in encoding QP value. Here, the size of image data or the frequency of transmission of image data may be varied.

For example, in a case where the number of transmission times exceeds a first threshold, the encoding processing section 26 may reduce the data rate. Additionally, in a case where the number of transmission times is smaller than a second threshold, the encoding processing section 26 may increase the data rate. Note that multiple thresholds may be set such that the data rate varies at multiple levels.

Note that the present invention is not limited to the above-described embodiment.

The range of application of the present invention is not limited to the cloud gaming system 1. The present invention is also applicable to, for example, a game system including a server disposed in a home and a terminal connected to the server via a home network, a public network, a carrier network for cellular phones, or other networks. In other words, the computer network 14 may be a home network, a public network, a carrier network for cellular phones, or other networks. Additionally, the server and the terminal may be connected to each other in a wired or wireless manner.

Additionally, the contents of the game to which the present invention is applied are not particularly limited to specific contents, and the present invention is also applicable to, for example, a game system that executes a game using VR (Virtual Reality) or AR (Augmented Reality).

In addition, the specific character strings and numerical values described above, and the specific character strings and numerical values in the drawings are illustrative, and the present invention is not limited to these character strings and numeral values.

The invention claimed is:

1. A transmission apparatus comprising:
an acquisition section that acquires a first image rendered in a frame buffer and that acquires a second image rendered in the frame buffer;
an encoding processing section that encodes the first image to generate first image data and that encodes the second image to generate second image data;
a transmission section that transmits the first image data and that transmits the second image data; and
a check section that checks likelihood of a failure in transmission of the first image data, wherein
the second image is an image rendered in the frame buffer for a first time after a timing when a predetermined time has elapsed since the transmission of the first image data, and
the encoding processing section controls whether or not to generate the second image data requiring no reference destination, depending on the likelihood of the failure in the transmission of the first image data at a timing of encoding the second image.

2. The transmission apparatus according to claim 1, wherein
the check section checks whether or not the transmission of the first image data has been successful, and
the encoding processing section controls whether or not to generate the second image data requiring no reference destination, depending on whether or not the successful transmission of the first image data has been confirmed before the timing of encoding the second image.

3. The transmission apparatus according to claim 2, wherein the check section checks whether or not the transmission of the first image data has been successful, on a basis of whether or not an acknowledgement indicating successful reception of the first image data has been received from a terminal configured to receive the first image data.

4. The transmission apparatus according to claim 2, wherein the check section checks whether or not the transmission of the first image data has been successful, on a basis of a transmission failure likelihood signal and a transmission failure likelihood cancel signal, the transmission failure likelihood signal indicating that reception of the first image data has not been confirmed and being transmitted from the terminal configured to receive the first image data, the transmission failure likelihood cancel signal indicating that the successful reception of the first image data has been confirmed and being transmitted from the terminal after the transmission failure likelihood signal is transmitted.

5. The transmission apparatus according to claim 2, wherein,
- in a case where the successful transmission of the first image data has not been confirmed before the timing of encoding the second image, the encoding processing section generates two related pieces of the second image data that include one piece of the second image data requiring a reference destination and another piece of the second image data requiring no reference destination, and
- the transmission section controls whether to transmit the second image data requiring a reference destination or to transmit the second image data requiring no reference destination, depending on whether or not the successful transmission of the first image data has been confirmed before a timing of transmitting the second image data.

6. The transmission apparatus according to claim 1, wherein, even in a case where a time required to determine that the failure in the transmission of the first image data is timed out has not elapsed, when the predetermined time has elapsed since the transmission of the first image data, the check section determines that the transmission of the first image data is likely to have failed.

7. The transmission apparatus according to claim 1, wherein the predetermined time is a time dynamically decided on a basis of statistics for records of transmission of image data.

8. The transmission apparatus according to claim 1, wherein the encoding processing section varies a data rate according to a frequency of transmission of image data requiring no reference destination, the frequency of transmission being based on the likelihood of the failure.

9. A transmission method comprising:
- acquiring a first image rendered in a frame buffer;
- encoding the first image to generate first image data;
- transmitting the first image data;
- acquiring a second image rendered in the frame buffer for a first time after a timing when a predetermined time has elapsed since transmission of the first image data;
- checking likelihood of a failure in the transmission of the first image data;
- encoding the second image to generate second image data; and
- transmitting the second image data, wherein,
- in the encoding the second image, whether or not to generate the second image data requiring no reference destination is controlled depending on the likelihood of the failure in the transmission of the first image data at a timing of encoding the second image.

10. A non-transitory, computer readable storage medium containing a program, which when executed by a computer, causes the computer to perform a transmission method by carrying out actions, comprising:
- acquiring a first image rendered in a frame buffer;
- encoding the first image to generate first image data;
- transmitting the first image data;
- acquiring a second image rendered in the frame buffer for a first time after a timing when a predetermined time has elapsed since transmission of the first image data;
- checking likelihood of a failure in the transmission of the first image data;
- encoding the second image to generate second image data; and
- transmitting the second image data,
- wherein, in the encoding the second image, whether or not to generate the second image data requiring no reference destination is controlled depending on the likelihood of the failure in the transmission of the first image data at a timing of encoding the second image.

* * * * *